(12) United States Patent
Weiler et al.

(10) Patent No.: US 6,523,217 B1
(45) Date of Patent: Feb. 25, 2003

(54) WIPER ELEMENT FOR CLEANING MOTOR VEHICLE WINDOWS

(75) Inventors: Paul Weiler, Kappelrodeck (DE); Wolfgang Leutsch, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/600,784

(22) PCT Filed: Jul. 23, 1999

(86) PCT No.: PCT/DE99/02249

§ 371 (c)(1), (2), (4) Date: Sep. 27, 2000

(87) PCT Pub. No.: WO00/30906

PCT Pub. Date: Jun. 2, 2000

(30) Foreign Application Priority Data

Nov. 25, 1998 (DE) .......................................... 198 54 307

(51) Int. Cl.⁷ .................................................. B60S 1/38
(52) U.S. Cl. .................................. 15/250.201; 15/250.44
(58) Field of Search ........................ 15/250.201, 250.44, 15/250.04, 250.43, 250.361

(56) References Cited

U.S. PATENT DOCUMENTS

| | | | | |
|---|---|---|---|---|
| 4,782,547 A | * | 11/1988 | Mohnach ................ | 15/250.201 |
| 5,383,249 A | | 1/1995 | Yang Ming-Tung ... | 15/250.201 |
| 5,661,870 A | * | 9/1997 | Eustache et al. ....... | 15/250.201 |

FOREIGN PATENT DOCUMENTS

| | | | | |
|---|---|---|---|---|
| DE | 4322961 | * | 1/1995 | ............ 15/250.201 |
| DE | 195 28 015 C1 | | 10/1996 | |
| EP | 0 650 876 A | | 5/1995 | |
| FR | 2642715 | * | 8/1990 | ............ 15/250.201 |
| FR | 2 689 835 A | | 10/1993 | |
| FR | 2 739 338 A | | 4/1997 | |

* cited by examiner

*Primary Examiner*—Gary K. Graham
(74) *Attorney, Agent, or Firm*—Michael J. Striker

(57) ABSTRACT

The invention if based on a wiper blade for cleaning windows (10) of motor vehicles, having a wiper strip (16) retained by a support bracket system (12, 14). At least one gutter (22, 24, 26, 28, 30, 32, 34, 74, 76, 78) oriented in the longitudinal direction (18, 20) is disposed directly or indirectly on the support bracket system (12, 14) and conducts water outward of a main viewing field.

1 Claim, 7 Drawing Sheets

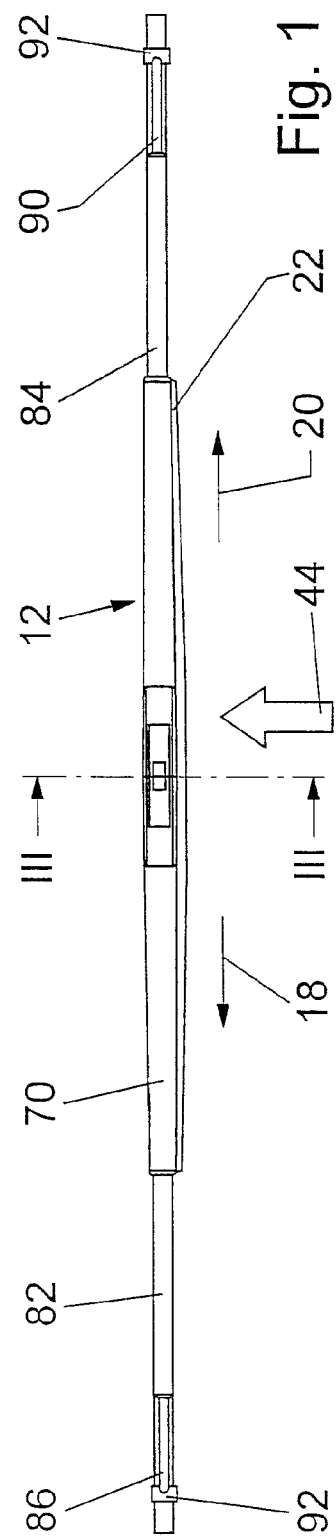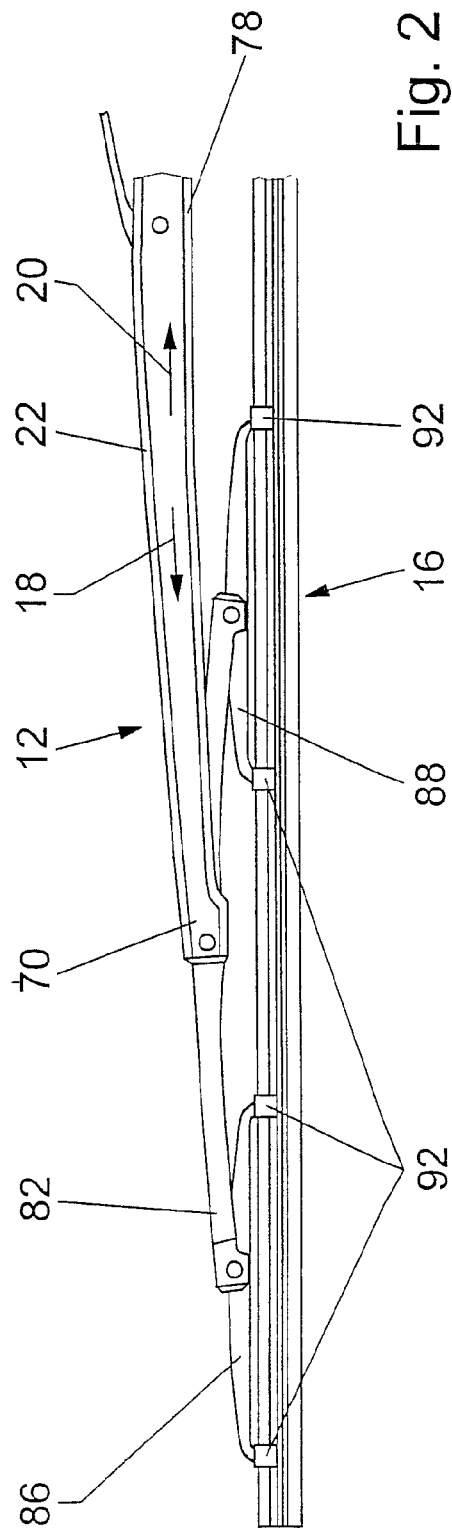

Figure 3:
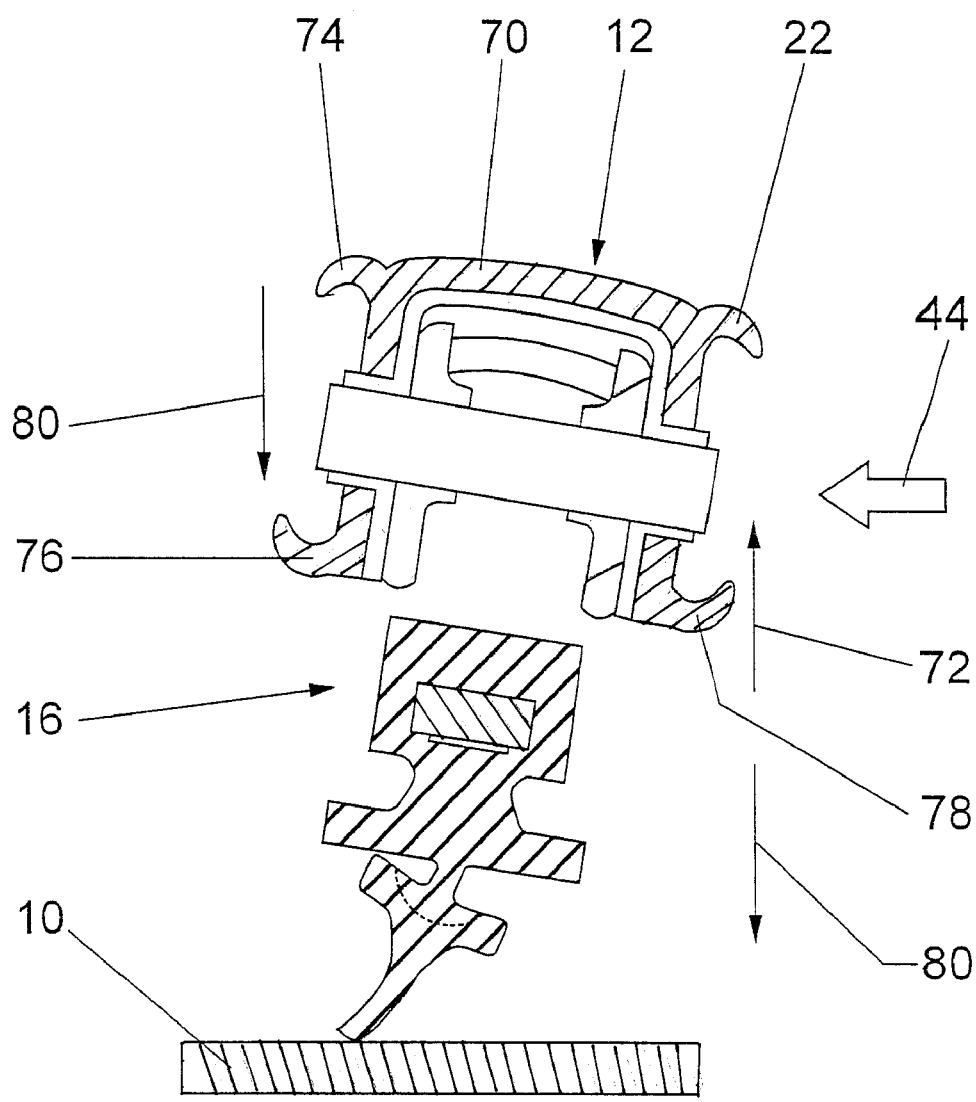

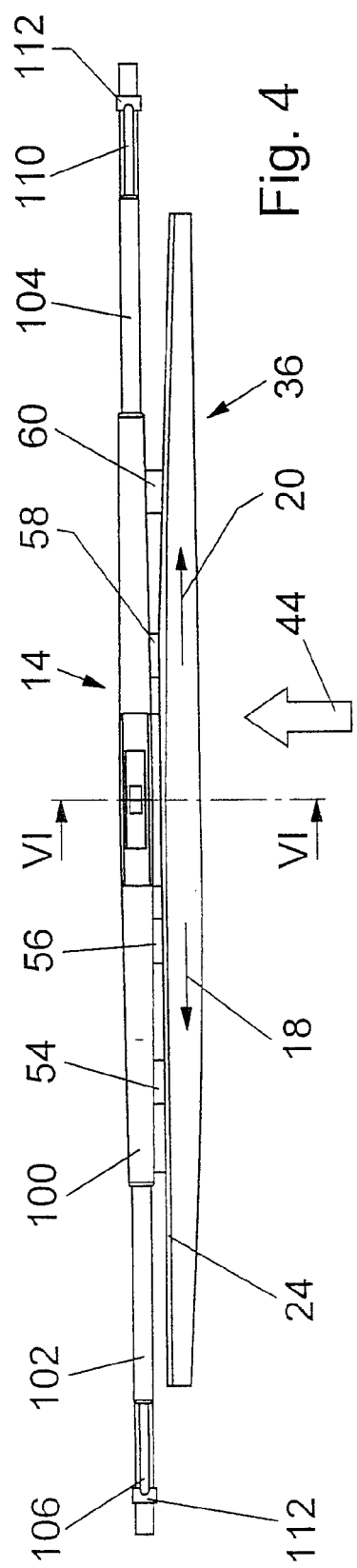
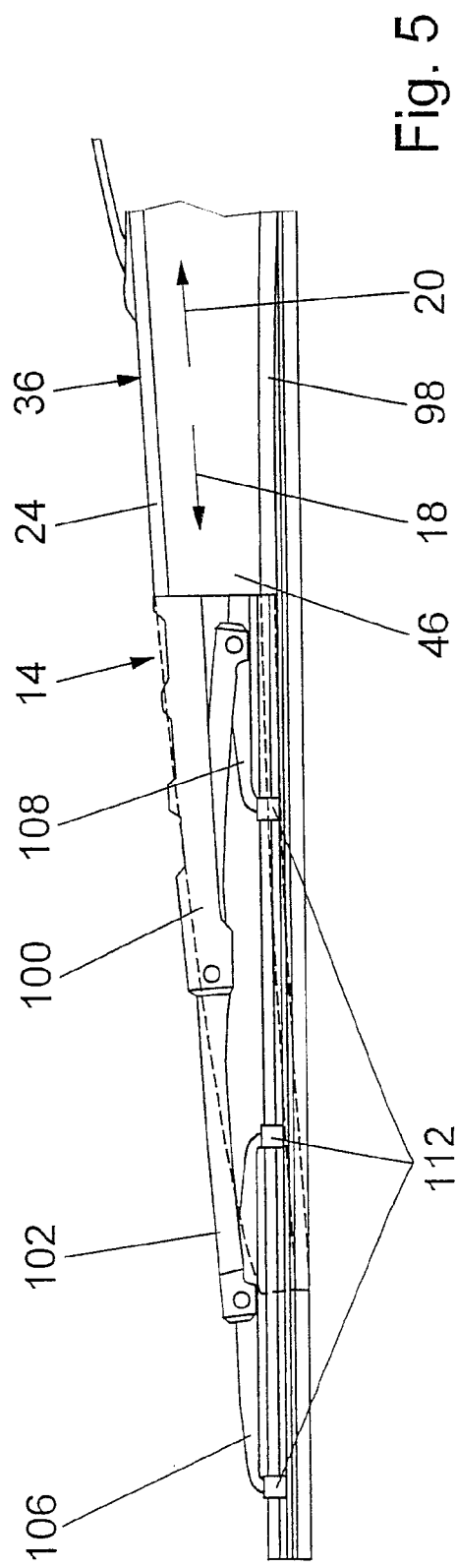

WIPER ELEMENT FOR CLEANING MOTOR VEHICLE WINDOWS

PRIOR ART

The invention is based on a wiper blade for cleaning motor vehicle windows.

Known windshield or window wipers have a wiper arm, which is constructed of a fastening part, secured to a drive shaft, a link part joined to it via a toggle joint, and a wiper rod rigidly adjoining the link part. The windshield wiper also has a wiper blade, which has a support bracket system and a wiper strip retained by the support bracket system. The wiper blade is pivotably connected to the wiper arm by the provision that a hooklike end of the wiper rod engages between two side cheeks of the support bracket system and includes a link bolt. The joint thus formed guides the wiper blade with the wiper strip over a motor vehicle window; the link part and the support bracket system make it possible for the wiper strip to adapt to a curvature of the motor vehicle window. A requisite contact pressure of the wiper strip on the motor vehicle window is attained with at least one tension spring, which tenses the fastening part and the link part jointly with the wiper rod, via the toggle joint.

The wiper strip comprises an elastomer. It has a head strip, which is joined via a tilted rib to a wiper lip that rests on the window to be wiped. By means of the tilting rib, at the turning point of the wiper motion the wiper strip can flip over in the opposite direction, so that it always assumes a favorable angle to the windshield. If the windshield wiper is actuated, the wiper strip slides with the wiper lip over the motor vehicle window. When the motor vehicle is in motion, a relative wind flows under the wiper arm and the wiper blade and generates a force counter to the contact pressure of the tension spring. Especially at high speeds, the relative wind can reduce the contact pressure of the wiper blade on the windshield so much that the wiper blade will lift from the windshield and float on a film of water, or that the wiper lip of the wiper strip will be blown over. This causes jittering of the wiper blade on the windshield and makes the cleaning quality inadequate.

It is known to secure a wind deflector in the downward wiping direction in front of the wiper blade on the driver's side; this wind deflector conducts the relative wind over the wiper blade and thus presses the wiper blade against the vehicle window. To prevent the relative wind from flowing under the wind deflector and causing wind noises and reducing the contact pressure, the wind deflector should be disposed with a lower edge as close as possible to the windshield. The closer the spacing between the wind deflector and the windshield, the better the relative wind is carried over the wiper blade, but also the sooner the wind deflector comes into contact with the windshield, for instance at various influential variables that occur together, such as play between individual components, deformation of individual components because of a strong relative wind, and so forth.

From German Patent DE 195 28 015 C1, a wiper blade with a wind deflector is known on which an elastic wind conducting element is secured; this element is disposed approximately parallel to the wiper lip, near the windshield, and is elastically braced or is elastically deformable in such a way that at higher vehicle speeds, and at the relative wind, it presses against on the windshield, at least in a wiping region.

Water, such as rainwater or cleaning fluid from the windshield washer nozzles, and so forth that strikes the support bracket system and/or the wind deflector and adheres to it is often blown by the relative wind during wiping onto an area of the windshield that is already been wiped and thus hinders the view.

ADVANTAGES OF THE INVENTION

According to the invention, at least one gutter oriented in the longitudinal direction is disposed directly or indirectly on a support bracket system and conducts water outward of a main viewing field. Water striking the wiper blade and already adhering to it is blown by the relative wind into the gutter and inside it is blown outward in the longitudinal direction out of the viewing field, specifically toward the end that points upward during wiping. The water is carried outward in a purposeful way, and areas of the windshield that have already been wiped remain free of water adhering to the wiper blade, and the view is improved.

Wind deflectors have a large closed surface area, which compared to a support bracket system is struck by larger quantities of water. In addition, in both the downward wiping motion and the upward wiping motion, the wind deflector conducts the relative wind over the support bracket system. Particularly in the downward wiping motion, water from the wind deflector is blown onto the cleaned windshield. It is therefore especially advantageous that at least one gutter is disposed on the wind deflector. Water primarily strikes a front side facing into the relative wind. The relative wind blows the water more or less, depending on the position of the wiper, into an upper region of the wind deflector that is remote from the window. In one feature of the invention, the gutter is disposed in the upper region of the wind deflector, as much as possible on its uppermost edge, or else the gutter forms the uppermost edge of the wind deflector. The less area there is remaining toward the top downstream of the gutter, the more completely can the water be conducted on the wind deflector into the gutter and outward, and that much less water is blown from a still remaining area above the gutter onto the already-cleaned windshield.

Sometimes water can reach an inside of the wind deflector facing away from the relative wind, primarily via a lower edge, facing toward the windshield, for instance from a stream of water from a windshield washer during wiping. To prevent this water from passing from the inside into the main viewing field of the windshield, it is proposed that at least one gutter be disposed on the inside of the wind deflector. In the lower region of the wind deflector and/or in the upper region of the wind deflector, the water can be caught with a gutter and conducted to the outside.

In one feature, the gutter is disposed on an upper edge of the wind deflector, on the side facing away from the window, and protrudes in the direction of the support bracket system past the inside of the wind deflector and in the direction away from the support bracket system it protrudes past the front side of the wind deflector. With a gutter, water can advantageously be caught from the front side and from the inside and conducted outward. This dispenses with a second, additional component for a gutter on the inside.

The gutter can be secured to the support bracket system or to the wind deflector by nonpositive, positive and/or material engagement, for instance via a plug-type, clamping, adhesive, and/or welded connection. Especially advantageously, however, the gutter is embodied integrally with the support bracket system and/or with the wind deflector. This dispenses with additional components, assembly steps, and expense. The gutter can be formed by a protrusion that protrudes past the surface of the wind deflector, or by an indentation made in the surface. With an indentation, there is economy of both material and weight. Moreover, the wind deflector can be embodied in a streamlined fashioned, with only slight turbulence at the gutter.

In a further feature, it is proposed that instead of one gutter, a plurality of gutters be made in the surface of the front side of the wind deflector by indentations. Each of the gutters then has to carry less water outward and as a result can be especially small and streamlined in form. The gutters can be formed onto the wind deflector during casting or can be made later, for instance by metal-cutting machining, or with a heat source or ultrasound source, and so forth.

To prevent water from being blown out of the gutter by the relative wind, the gutter is closed in the direction facing away from or in the direction of the window.

DRAWING

Further advantages will become apparent from the ensuing drawing description. In the drawing, exemplary embodiments of the invention are shown. The drawing, description and claims contain numerous characteristics in combination. One skilled in the art will expediently consider the characteristics individually as well and combine them into appropriate further combinations.

Figure 6:
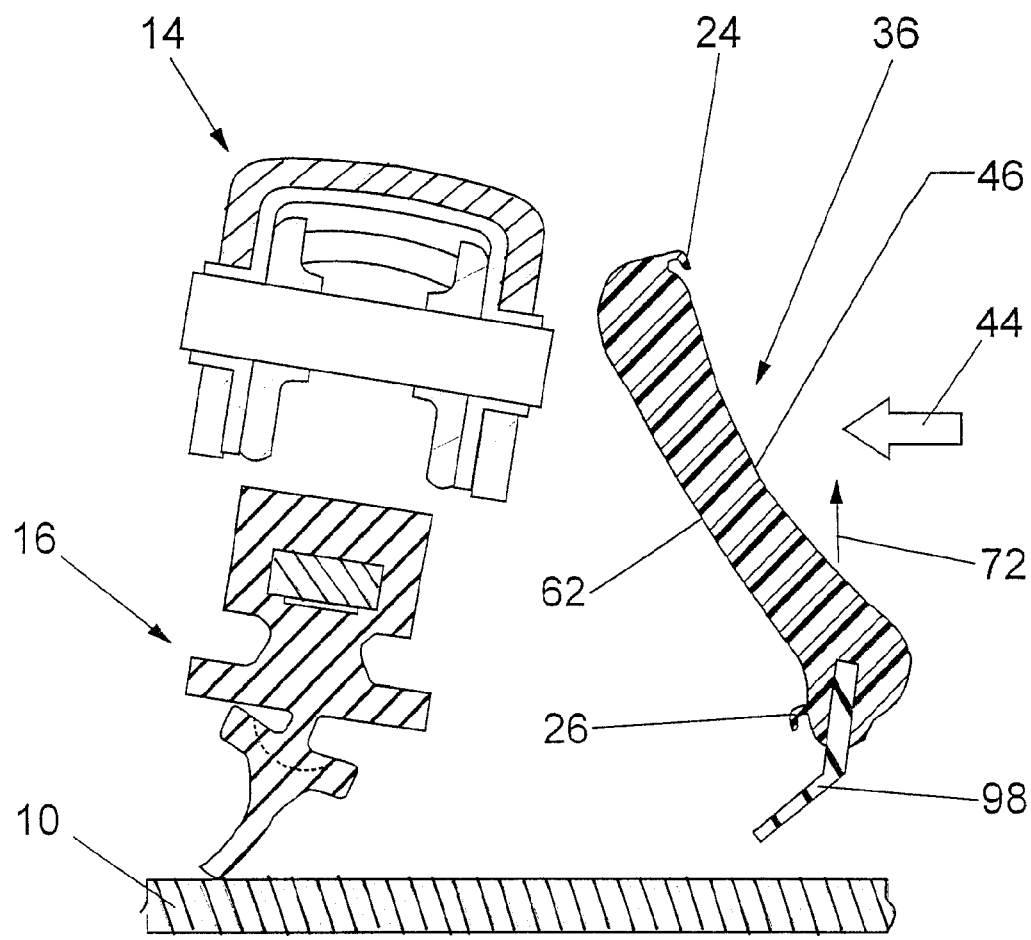

Shown are:

FIG. 1, a wiper blade from above;

FIG. 2, an enlarged detail of a wiper blade of FIG. 1 from the side;

FIG. 3, a section along the line III—III of FIG. 1;

FIG. 4, a wiper blade with a wind deflector from above;

FIG. 5, an enlarged detail of a wiper blade of FIG. 4 from the side;

FIG. 6, a section along the line VI—VI of FIG. 4; and

Figure 7:
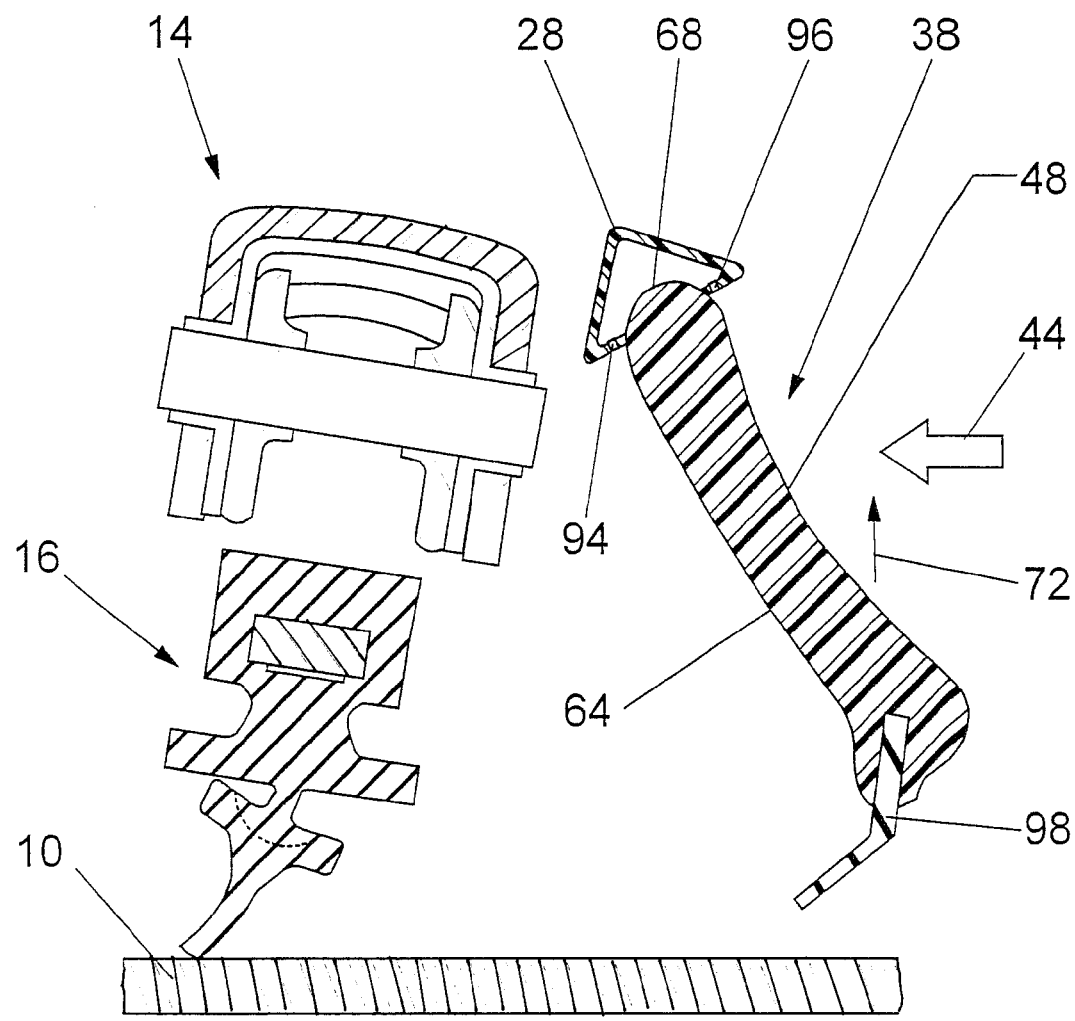
Figure 8:
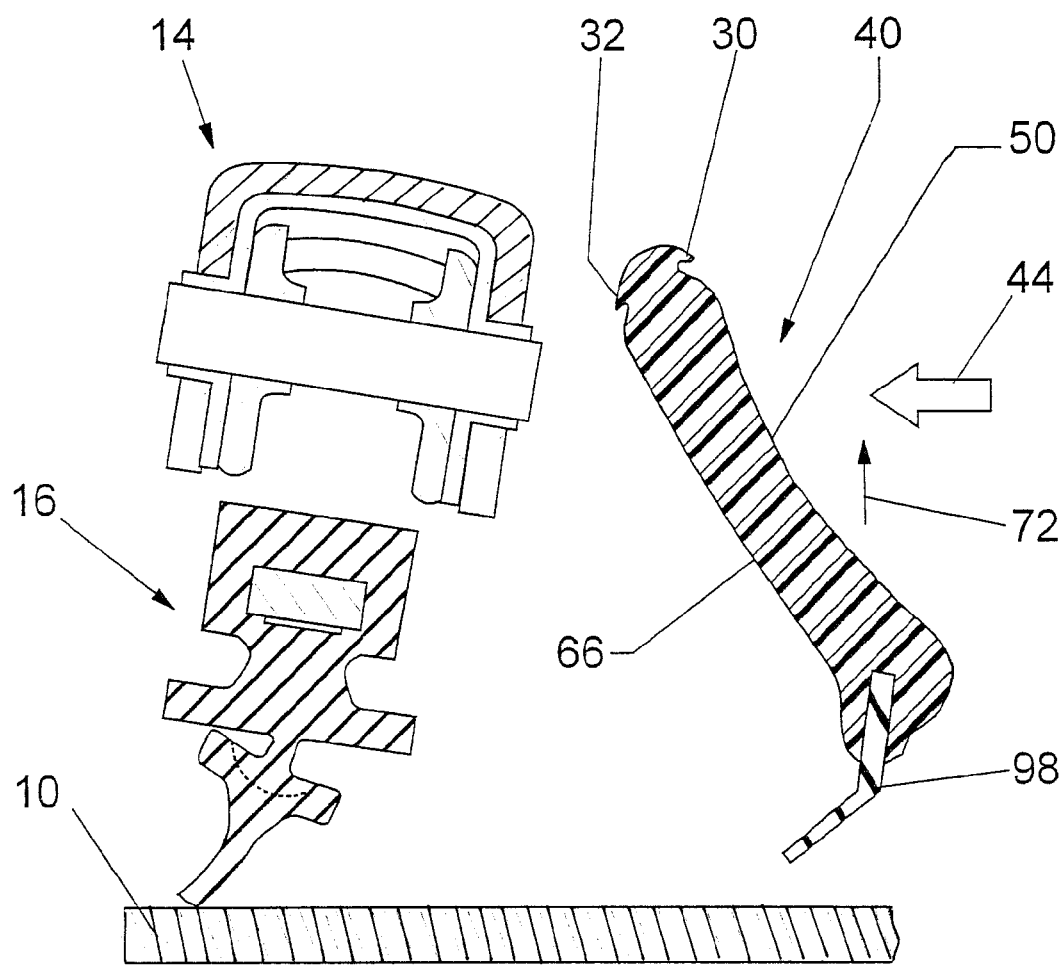
Figure 9:
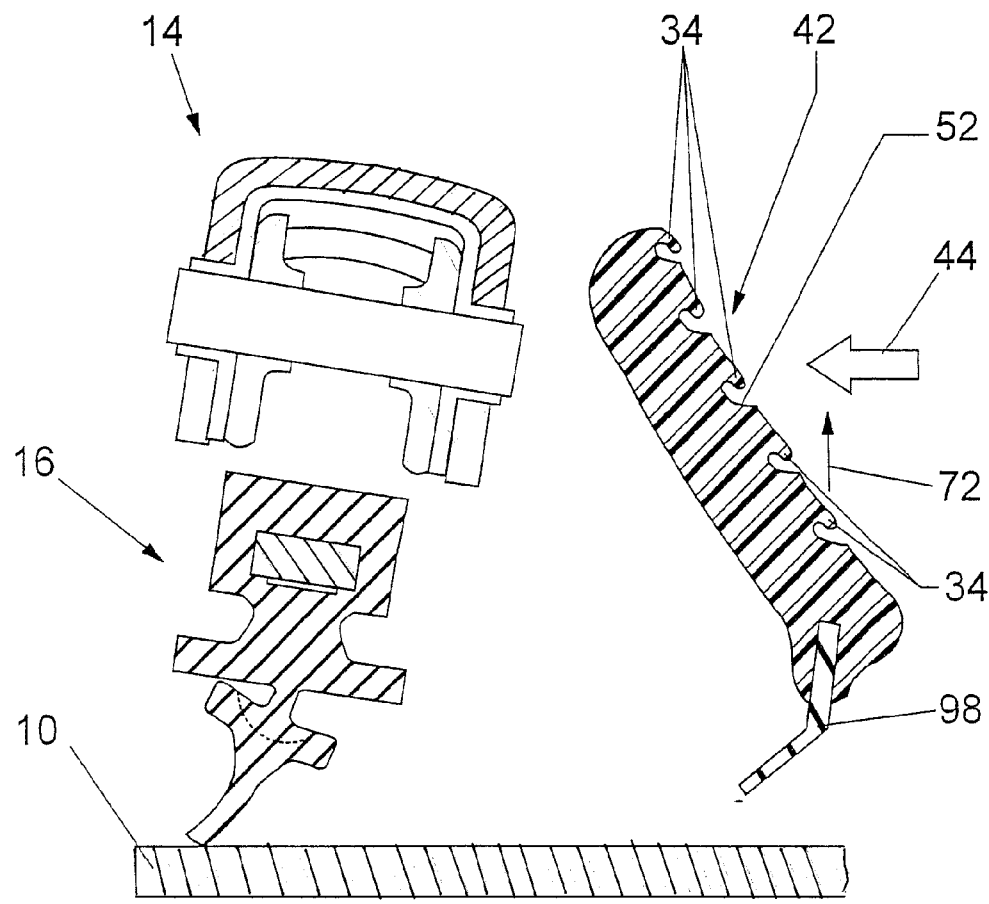

FIGS. 7, 8, 9, variants of FIG. 6.

DESCRIPTION OF THE EXEMPLARY EMBODIMENTS

FIGS. 1 and 2 show a wiper blade, which has a support bracket system 12 with a main bracket 70, which is pivotably connected to intermediate brackets 82, 84, on whose ends claw brackets 86, 88, 90 are pivotably connected. A wiper strip 16 is secured in retaining claws 92 of the claw brackets 86, 88, 90. According to the invention, a gutter 22 oriented in the longitudinal direction 18, 20 is disposed on the support bracket system 12, specifically on the main bracket 70. Gutters can also be disposed on the intermediate brackets and on the claw brackets.

Water striking and adhering to the main bracket 70 is blown by the relative wind 44 into the gutter 22 and in it outward, out of the main viewing field, to the upper-pointing end of the main bracket 70. The gutter 22 is disposed in the upper region, on the side facing away from the windshield 10, and it is closed in the direction 72 remote from the window 10, so that no water can be blown out of the gutter 22 over the wiper blade (FIG. 3).

In a wiper system having only one wiper arm, a single-arm wiper in operation pivots from one side of the windshield 10 through a middle position to another side, and in the process is attacked by relative wind 44 equally from both sides, crosswise to its longitudinal direction. Particularly in a single-arm wiper, gutters 22, 74 are advantageously disposed on both sides of the main bracket 70, in the upper region facing away from the windshield 10, as shown in FIG. 3. With gutters 76, 78 disposed in the lower region of the main bracket 70, these gutters being closed in the direction 80, water can also be caught and conducted outward out of the main viewing field; this water flows on the main bracket 70 in the direction 80 of the windshield 10, for instance the downward wiping direction in the case of a single-arm wiper. The gutters 22, 74, 76, 78 are embodied integrally with the main bracket 70. This economizes on additional components, assembly steps and expenses.

FIGS. 4, 5 and 6 show a wiper blade with a wind deflector 36. The wind deflector 36 is supported on a support bracket system 14 via fastening elements 54, 56, 58, 60. The support bracket system 14 has a main bracket 100, intermediate brackets 102, 104, and claw brackets 106, 108, 110 with retaining claws 112. To gently cushion the impact of the wind deflector 36 on the windshield 10, an elastic lip 98 is secured to the wind deflector 36 (FIGS. 5 and 6) on the side facing toward the windshield 10. The wind deflector 36 extends in the longitudinal direction 18, 20 over virtually the entire length of the wiper blade and thus covers the support bracket system 14 of the wiper blade.

In a windshield wiper system with two wiper arms, the wind deflector 36 is preferably secured to both or only to the support bracket system 14 on the driver's side. In known windshield wiper systems, the wiper blades are disposed in their parking positions side-by-side in the lower region on the windshield 10. The wiper arms pivot not at all or only slightly past a vertical position and as a result experience the relative wind 44 from only one side in their downward and upward wiping motions crosswise to their length. The wind deflector 36 is secured to the wiper blade on this side of the wiper blade, ahead of the wiper blade in the downward wiping motion, and presses the wiper blade against the windshield 10 over the entire wiping radius. In principle, a wind deflector can also be secured to a single-arm wiper.

According to the invention, in the longitudinal direction 18, 20 of the wind deflector 36, a gutter 24 is disposed in the upper region, on the side facing away from the windshield 10, on a front side 46 (FIG. 6). Water striking and adhering to the wind deflector 36 is blown into the gutter 24 and in it outward out of the main viewing field, to the upward-pointing end of the wind deflector 36. In the direction 72 facing away from the window 10, the gutter 24 is closed, so that no water can be blown out of the gutter 24 over the wiper blade (FIG. 6). In addition, on an inside 62 of the wind deflector 36 in the lower region, on the side facing the windshield 10, a second gutter 26 is provided, by way of which water that has reached the inside 62 is conducted outward. Like the gutter 24, the gutter 26 is closed in the direction 72 facing away from the windshield 10, to prevent water from being blown onto the cleaned windshield 10 via the gutter 26 and over the wiper blade. Both gutters 24, 26 are embodied integrally with the wind deflector 36. This dispenses with additional components.

In FIGS. 7, 8 and 9, variants of a wiper blade with a wind deflector 38, 40 and 42 and with gutters 28, 30, 32, 34 of FIG. 6, disposed in the longitudinal direction 18, 20 (FIG. 5), are shown. Components that remain the same are all identified by the same reference numerals. A gutter 28 is mounted on an upper edge 68 of the wind deflector 38, on the side facing away from the window 10; this gutter protrudes in the direction of the support bracket system 14 past the inside 64 of the wind deflector 38 and in the direction remote from the support bracket system, it protrudes past the front side 48 of the wind deflector 38 (FIG. 7). Water striking the wind deflector 38 and adhering is blown upward in the direction 72 through openings 94, 96 into the gutter 28 by the relative wind 44. With a gutter 28, water from the inside 64 and from the front side 48 can advantageously be conducted outward, out of the main viewing field.

The wind deflector 40 in FIG. 8 has gutters 30, 32 on the front side 50 and on the inside 66 in the upper region, on the side facing away from the windshield 10. The gutters 30, 32 are formed, instead of by protrusions, by indentations in the surface of the wind deflector 40. Standard wind deflectors can be used and retrofitted with gutters 30, 32. The wind deflector 40 can furthermore be embodied in an especially streamlined way and, by using less material, can be lightweight and economical.

Instead of disposing only one relatively large gutter 30 on the wind deflector 40 on the front side 50, a plurality of smaller gutters 34 can be made in the surface of the wind deflector 42, on the front side 52, as shown in FIG. 9. The wiper blades shown in FIGS. 1–30 9, having the gutters 22, 24, 26, 28, 30, 32, 34, 74, 76, 78 represent only one selection among the possible variants, and in particular the gutters 22, 24, 26, 28, 30, 32, 34, 74, 76, 78 can be combined with one another and mounted on a wind deflector and/or on a support bracket system.

What is claimed is:

1. A wiper blade assembly for cleaning a main viewing field of windshields (10) of motor vehicles, said assembly comprising a wiper strip (16) retained by a support bracket system (14), an elongated wind deflector (38) for directing wind is secured to the support bracket system (14) and defines opposing outer (48) and inner (64) sides and opposing upper (68) and lower edges thereon, said outer side faces away from said support bracket system and said inner side faces towards said support bracket system, a hollow gutter member (28) is disposed on said upper edge and protrudes past said outer and inner sides, said gutter member includes openings therethrough on both sides of said deflector such that water striking the wind deflector and adhering thereto can be blown upward and through said openings and into the hollow of the gutter by the wind, wherein water collected in said hollow can be conducted outwardly and away from the main viewing field.

* * * * *